United States Patent
Häring et al.

(10) Patent No.: US 12,267,541 B2
(45) Date of Patent: Apr. 1, 2025

(54) INTERACTIVE VIDEO STREAMING FOR 3D APPLICATIONS

(71) Applicant: MONKEYWAY GmbH, Munich (DE)

(72) Inventors: Christian Häring, Bavaria (DE); Stefan Koch, Bavaria (DE); Andreas Adam, Bavaria (DE)

(73) Assignee: MONKEYWAY GmbH, Munich (DE)

( * ) Notice: Subject to any disclaimer, the term of this patent is extended or adjusted under 35 U.S.C. 154(b) by 11 days.

(21) Appl. No.: 18/478,238

(22) Filed: Sep. 29, 2023

(65) Prior Publication Data

US 2024/0114190 A1    Apr. 4, 2024

Related U.S. Application Data

(60) Provisional application No. 63/377,986, filed on Sep. 30, 2022.

(51) Int. Cl.
*H04N 21/262* (2011.01)
*G06T 9/00* (2006.01)
(Continued)

(52) U.S. Cl.
CPC ......... *H04N 21/26208* (2013.01); *G06T 9/00* (2013.01); *G06T 15/00* (2013.01); *H04N 21/21805* (2013.01); *H04N 21/44227* (2013.01); *H04N 21/472* (2013.01); *H04N 21/8146* (2013.01); *H04L 65/65* (2022.05)

(58) Field of Classification Search
None
See application file for complete search history.

(56) References Cited

U.S. PATENT DOCUMENTS

| 2016/0295286 A1* | 10/2016 | Kang ................... H04N 21/482 |
| 2022/0385721 A1* | 12/2022 | Kamaraju ............. G06T 19/006 |
| 2024/0064387 A1* | 2/2024 | Singh ................. H04N 21/8547 |

FOREIGN PATENT DOCUMENTS

| CN | 112783064 A | 5/2021 |
| EP | 3862060 A1 | 8/2021 |

OTHER PUBLICATIONS

International Search Report and Written Opinion received for PCT Patent Application No. PCT/IB2023/000591, mailed on Mar. 13, 2024, 15 pages.

* cited by examiner

*Primary Examiner* — Junior O Mendoza
(74) *Attorney, Agent, or Firm* — Hamilton, Brook, Smith & Reynolds, P.C.

(57) ABSTRACT

Systems and methods for video processing generates 3D streaming data via an API may be provided. A 3D streaming session may be delivered at a client device with low latency and high throughput capacity. Upon verification of the client device, a server may be selected to support an encapsulated 3D streaming engine to initiate the session. A library file may be injected into an executable file of the encapsulated 3D streaming engine to generate a digital representation of an interactive 3D environment. The interactive 3D environment may be rendered, encoded, and streamed to the client device via a GPU. The 3D streaming session may be adjusted via the client device, and sustained until terminated at the client device. A number of virtual compute instances of encapsulated 3D streaming engines provided by the server may be dynamically adjusted based on metrics and machine learning predictions of connected client devices.

28 Claims, 8 Drawing Sheets

(51) Int. Cl.
*G06T 15/00* (2011.01)
*H04N 21/218* (2011.01)
*H04N 21/442* (2011.01)
*H04N 21/472* (2011.01)
*H04N 21/81* (2011.01)
*H04L 65/65* (2022.01)

INTERACTIVE VIDEO STREAMING FOR 3D APPLICATIONS

RELATED APPLICATION(S)

This application claims the benefit of U.S. Provisional Application No. 63/377,986, filed on Sep. 30, 2022. The entire teachings of the above application are incorporated herein by reference.

BACKGROUND

Streaming video applications have taken on a new dimension of late, seeking to provide ever-more immersive experiences for users. As virtual substitutes for in-person interactions continue to develop, users are provided with opportunities to connect safely and securely across large geographical distances.

SUMMARY

Embodiments of the disclosure provide technology for streaming interactive video and audio content of interest to a user. The streaming technology provides users with a high-quality, low-latency video and audio streaming experience. A graphics processing unit (GPU) instance is configured to directly host services supporting streaming of content, facilitating implementation of the approach without middleware or plugins. Embodiments of the present invention are directed to systems and methods for video processing, and for streaming processed media content to client devices of these users.

In some embodiments, a video processing system includes a plurality of servers operating in a peer-to-peer communication network via a WebRTC application programming interface (API) to generate 3D streaming data. The plurality of servers may respond to a session handler receiving a request for a 3D streaming session at a first client device in part by receiving from the session handler in communication with the first client device, context verification about the first client device including an internet protocol (IP) location of the first client device. The plurality of servers may respond to the context verification about the first client device by assigning a first server from the plurality to direct a 3D streaming session at the first client device based on the IP location of the first client device.

To continue, the plurality of servers may direct a first instance of an encapsulated 3D streaming engine at the first server to initiate the 3D streaming session via the WebRTC API at the first client device. The plurality of servers may inject a library file of the WebRTC API into an executable file of the encapsulated 3D streaming engine to generate a digital representation of an interactive 3D environment for the 3D streaming session at the first client device.

The plurality of servers may continue by rendering the digital representation of the interactive 3D environment within a buffer of the GPU, encoding the rendered representation for transmission of the 3D streaming session to the first client device, and streaming the encoded representation of the interactive 3D environment at the first client device. The plurality of servers may dynamically adjust the 3D streaming session of the interactive 3D environment in response to input received from the first client device.

The plurality of servers may sustain the digital representation of the interactive 3D environment of the 3D streaming session by iteratively performing processing pertaining to the aforementioned rendering, encoding, streaming, and adjusting, until the 3D streaming session is terminated at the first client device.

The first server may be configured to establish a pre-determined number of virtual compute instances (VCIs) of the 3D streaming session to one or more client devices, and the first server may be configured to automatically adjust the provided number of VCIs based on a change in number of the client devices. At least one of the one or more client devices may be the first client device.

At least one of the plurality of servers may be configured to respond to requests for 3D streaming sessions from the client devices by assigning a server from the plurality of servers to respond to the respective requests for 3D streaming sessions. The first server may be one of the plurality of servers.

At least one of the plurality of servers may compute analytics to determine an appropriate number of 3D streaming sessions for the plurality of client devices scaled based on the pre-determined number of VCIs. The calculated analytics may include concurrent users (CCU), session time, daily active users (DAU), monthly active users (MAU), and sessions. The encapsulated 3D streaming engine may configure the 3D streaming session as a video streaming cluster causing at least one of the plurality of servers to perform multicasting transmissions of packets including at least portions of the digital representation of the interactive 3D environment to the one or more client devices.

Dynamically adjusting the 3D streaming session of the interactive 3D environment in response to input received from the first client device may further include the encapsulated 3D streaming engine being configured to capture events associated with the interactive 3D environment. The events may be detected by one or more listeners at one or more of the client devices. The dynamic adjusting may further include the encapsulated 3D streaming engine being configured to capture metadata, consumption information and interaction data during the 3D streaming session at the one or more of the client devices. The dynamic adjusting may further include the encapsulated 3D streaming engine being configured to respond to the captured events, metadata, consumption information and interaction data by redrawing the interactive 3D environment at the one or more client devices to sustain the digital representation of the interactive 3D environment.

The encapsulated 3D streaming engine may sustain the digital representation of the interactive 3D environment by calculating composite 3D video data based on the captured events, metadata, consumption information and interaction data defining a composite image layout based on properties derived from the 3D streaming session at the one or more client devices, configuring the 3D streaming session to provide a composite video signal according to the defined composite image layout, and transmitting the composite video signal in packets via a packetizer to the one or more client devices. The encapsulated 3D streaming engine may interface with the one or more client devices to facilitate controlling a communication interface enabling voice, text, and video transmissions among the one or more client devices in a packet switched communication system of the peer-to-peer network.

The encapsulated 3D streaming engine may be configured as a container including bindings of software components. The software components may include at least one of: the library file of the WebRTC API, event manager, scene manager, resource manager, session manager, physics manager and artificial intelligence system. The WebRTC API may include one or more WebRTC API functions that are configured to call one or more of the software components. The encapsulated 3D streaming engine may be other than a software plugin.

The input may be received over a data channel established using a RTCDataChannel API. The encapsulated 3D streaming engine may be configured to train an interactive frame prediction model for the digital representation of the interactive 3D environment based on encoded streaming data of the 3D streaming session and the events, the metadata, the interaction data and the consumption data from the one or more client devices.

The encapsulated 3D streaming engine may be configured to enable encoding of the 3D streaming session by selectively using a predicted frame generated based on the trained interactive frame prediction model, and transmit the trained interactive frame prediction model and the encoded streaming data to the first client device and a second client device to create the digital representation of the interactive 3D environment. The first and second client devices may be configured to receive the trained interactive frame prediction model and the encoded streaming data and decode the encoded streaming data based on the trained interactive frame prediction model to create the digital representation of the interactive 3D environment.

In some embodiments, a video processing method includes configuring a server computer system to respond to a session handler receiving a request for a 3D streaming session at a first client device. The responding to the session handler in communication with the first client device may include receiving from the session handler, context verification about the first client device including an IP location of the first client device. The responding to the session handler may include responding to the context verification about the first client device by assigning a first server from a plurality of servers of the server computer system to direct a 3D streaming session at the first client device based on the IP location of the first client device.

The responding to the session handler may include directing a first instance of an encapsulated 3D streaming engine at the first server to initiate the 3D streaming session via the WebRTC API at the first client device. The responding to the session handler may include injecting a library file of the WebRTC API into an executable file of the encapsulated 3D streaming engine to generate a digital representation of an interactive 3D environment for the 3D streaming session at the first client device.

The responding to the session handler may include rendering the digital representation of the interactive 3D environment within a buffer of a GPU, encoding the rendered representation for transmission of the 3D streaming session to the first client device, and streaming the encoded representation of the interactive 3D environment at the first client device. The responding to the session handler may include dynamically adjusting the 3D streaming session of the interactive 3D environment in response to input received from the first client device.

The responding to the session handler may include sustaining the digital representation of the interactive 3D environment of the 3D streaming session by iteratively performing processing pertaining to the aforementioned rendering, encoding, streaming, and adjusting, until the 3D streaming session is terminated at the first client device. In video processing method embodiments, the method performs operations to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A high-performance, low-cost streaming solution is described herein. Such solution offers high visual quality and low latency, while being easily implemented, as a complete solution, by users with no programming skills.

System Architecture

Figure 1:
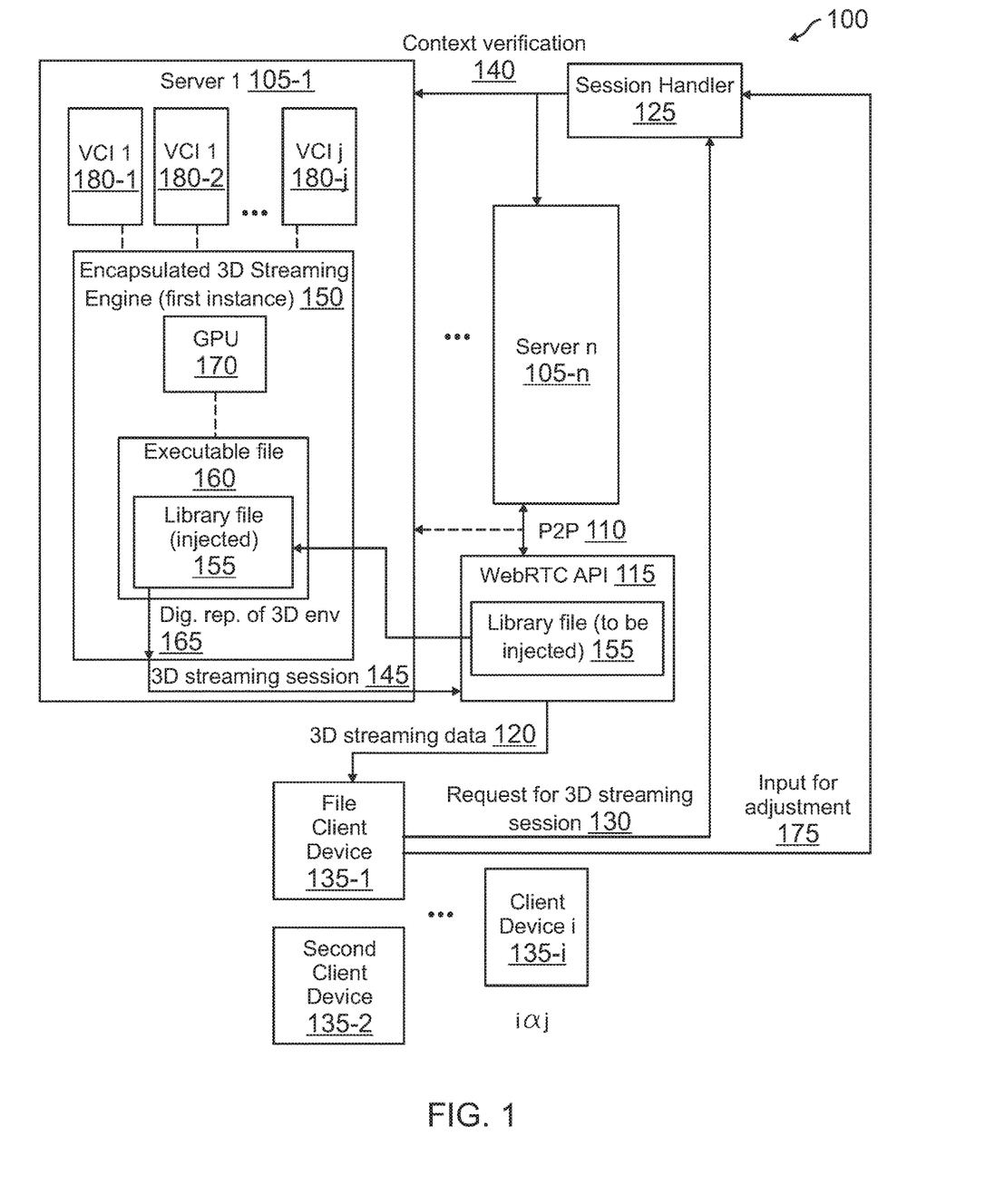
FIG. 1 is a schematic block diagram of an example video processing system according to the present disclosure.

FIG. 1 is a schematic block diagram of an example embodiment of a video processing system 100. In the example embodiment, the video processing system 100 includes a plurality of servers 105-1, 105-n operating in a peer-to-peer (i.e., P2P) communication network 110 via a WebRTC application programming interface (API) 115 to generate 3D streaming data 120. The plurality of servers 105-1, 105-n may respond to a session handler 125 receiving a request 130 for a 3D streaming session at a first client device 135-1 in part by receiving from the session handler 125 in communication with the first client device 135-1, context verification 140 about the first client device 135-1 including an internet protocol (IP) location of the first client device 135-1. The plurality of servers 105-1, 105-n may respond to the context verification 140 about the first client device 135-1 by assigning a first server 105-1 from the plurality 105-1, 105-n to direct a 3D streaming session 145 at the first client device 135-1 based on the IP location of the first client device 135-1.

In an example, the context verification 140 may include a distance metric based on the distance between respective servers 105-1, 105n and the first client device 135. In an embodiment, the context verification 140 regarding the first client device 135 may include the number of network hops—Intermediate routers or servers take time to process a signal transmitted from respective servers 105-1, 105n to the first client device 134. Synthetic monitoring tools may be deployed from respective servers 105-1, 105n to run artificial calls to the first client 145 and detect any increase in latency or performance degradation. Based on the context verification data analytics, a server may be selected from the servers 105-1, 105*n* that delivers the lowest latency and highest throughput capacity at the client.

To continue, the plurality of servers 105-1, 105*n* may direct a first instance of an encapsulated 3D streaming engine 150 at the first server 105-1 to initiate the 3D streaming session 145 via the WebRTC API 115 at the first client device 135-1. The plurality of servers 105-1, 105*n* may inject a library file 155 of the WebRTC API 115 into an executable file 160 of the encapsulated 3D streaming engine 145 to generate a digital representation of an interactive 3D environment 165 for the 3D streaming session 145 at the first client device 135-1.

The plurality of servers 105-1, 105*n* may continue by rendering the digital representation of the interactive 3D environment 165 within a buffer of a graphics processing unit (GPU) 170, encoding the rendered representation for transmission of the 3D streaming session 145 to the first client device 135-1, and streaming the encoded representation of the interactive 3D environment at the first client device 135-1. The plurality of servers 105-1, 105*n* may dynamically adjust the 3D streaming session 145 of the interactive 3D environment in response to input 175 received from the first client device 135-1.

The plurality of servers 105-1, 105*n* may sustain the digital representation of the interactive 3D environment 165 of the 3D streaming session 145 by iteratively performing processing pertaining to the aforementioned rendering, encoding, streaming, and adjusting, until the 3D streaming session is 145 terminated at the first client device 135-1.

Figure 2:
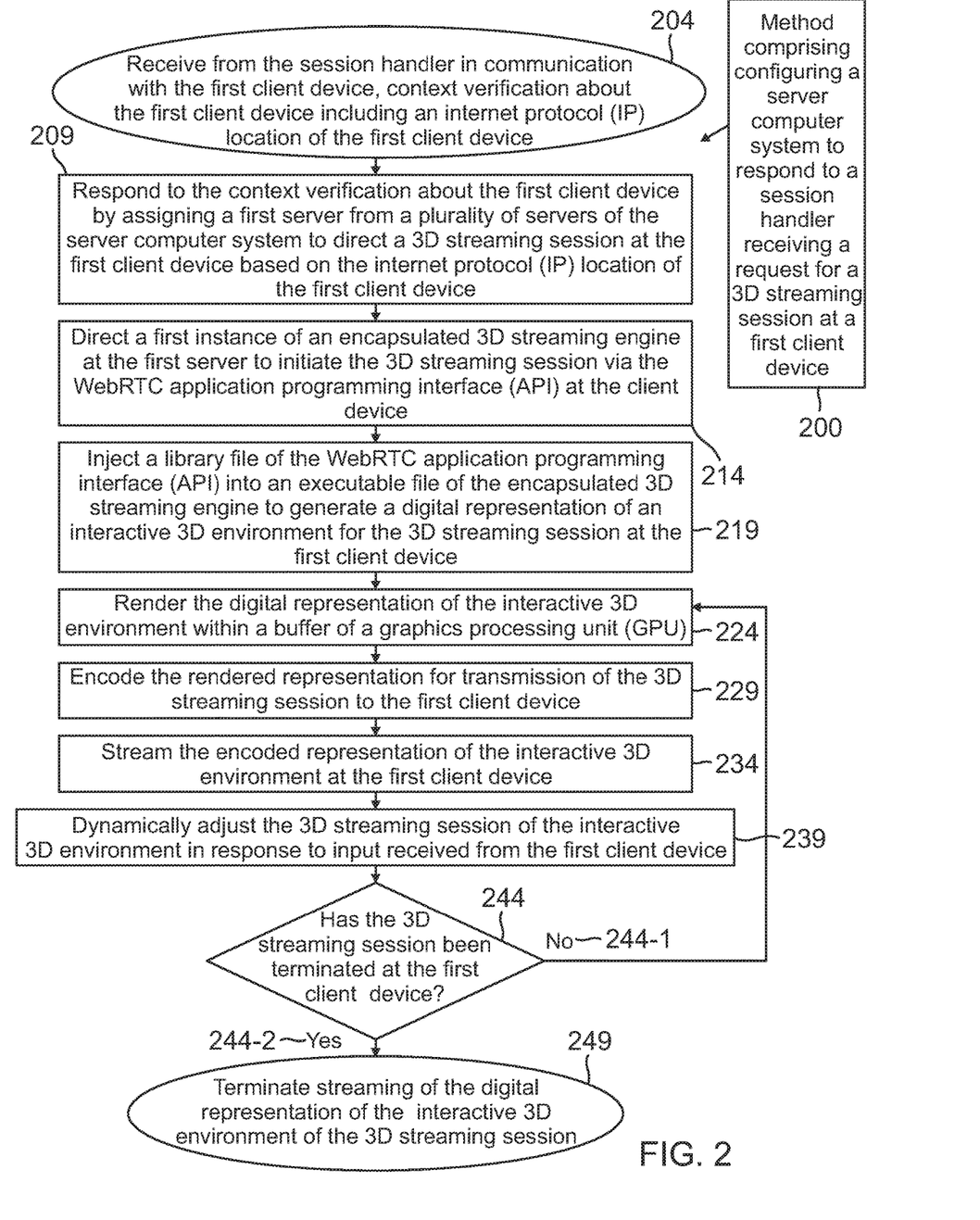
FIG. 2 is a flow diagram of an example video processing method according to the present disclosure.

FIG. 2 is a flow diagram of an example embodiment of a video processing method 200. In the example embodiment, the video processing method 200 includes configuring a server computer system, such as first server 105-1 of the plurality of servers 105-1, 105*n* of the system 100, to respond to a session handler 125 receiving a request 130 for a 3D streaming session at a first client device 135-1. In the method 200, the responding to the session handler 125 in communication with the first client device 135-1 may include receiving 204 from the session handler, context verification 140 about the first client device 135-1 including an IP location of the first client device 135-1. In the method 200, the responding to the session handler 125 may include responding 209 to the context verification 140 about the first client device 135-1 by assigning a first server 105-1 from a plurality of servers 105-1, 105*n* of the server computer system to direct a 3D streaming session 145 at the first client device 135-1 based on the IP location of the first client device 135-1.

In the method 200, the responding to the session handler 125 may include directing 214 a first instance of an encapsulated 3D streaming engine 150 at the first server 105-1 to initiate the 3D streaming session 145 via the WebRTC API 115 at the first client device 135-1. In the method 200, the responding to the session handler 125 may include injecting 219 a library file 155 of the WebRTC API into an executable file 160 of the encapsulated 3D streaming engine 150 to generate a digital representation of an interactive 3D environment 165 for the 3D streaming session 145 at the first client device 135-1.

In the method 200, the responding to the session handler 125 may include rendering 224 the digital representation of the interactive 3D environment 165 within a buffer of a GPU 170, encoding 229 the rendered representation for transmission of the 3D streaming session 145 to the first client device 135-1, and streaming 234 the encoded representation of the interactive 3D environment at the first client device 135-1.

In the method 200, the responding to the session handler 125 may include dynamically adjusting 239 the 3D streaming session 145 of the interactive 3D environment in response to input 175 received from the first client device 135-1.

In the method 200, the responding to the session handler 125 may include sustaining 244-1 the digital representation of the interactive 3D environment 165 of the 3D streaming session 145 by iteratively performing processing pertaining to the aforementioned rendering 224, encoding 229, streaming 234, and adjusting 239, until the 3D streaming session 145 is terminated 244-2 at the first client device 244. In response to the terminating 224-2 of the 3D streaming session 145, the method 200 may include terminating 249 streaming of the digital representation of the interactive 3D environment 165.

Returning to a discussion of FIG. 1, the first server 135-1, of the system 100, may be configured to establish a pre-determined number of virtual compute instances (VCIs) 180-1, 180-*j* of the 3D streaming session 145 to one or more client devices 135-1, 135-2, 135-*i*, and the first server 105-1 may be configured to automatically adjust the provided number of VCIs 180-1, 180-*j* based on a change in number of the client devices 135-1, 135-2, 135-*i*. At least one of the one or more client devices 135-1, 135-2, 135-*i* may be the first client device 135-1.

In the example system 100 of FIG. 1, a first 135-1, second 135-2, and ith 135-*i* client device are shown; however, it should be noted that there may be only a first client device 135-1, only a first 135-1 and second 135-2 client device, or another number i of client devices 135-1, 135-2, 135-*i*. Similarly, it should be noted that, while a first virtual compute instance (VCI 1) 180-1, a second virtual compute instance (VCI 2) 180-2, and a jth virtual compute instance (VCI j) are shown in the example system 100 of FIG. 1, there may be only a first virtual compute instance (VCI 1) 180-1, only a first (VCI 1) 180-1 and second (VCI 2) 180-2 virtual compute instance, or another number j of virtual compute instances (VCI 1, VCI 2, . . . , VCI j) 180-1, 180-2, 180-*j*. Similarly, it should be noted that there may be any number of servers 105-1, 105*n*, including one server 105-1, or another number n of servers 105-1, 105*n*.

At least one of the plurality of servers 105-1, 105*n* may be configured to respond to requests 130 for 3D streaming sessions 145 from the client devices 135-1, 135-*i* by assigning a server from the plurality of servers 105-1, 105*n* to respond to the respective requests 130 for 3D streaming sessions 145. The first server 105-1 may be one of the plurality of servers 105-1, 105-*n*.

At least one of the plurality of servers 105-1, 105*n* may compute analytics to determine an appropriate number of 3D streaming sessions 145 for the plurality of client devices 135-1, 135-*i* scaled based on the pre-determined number of VCIs 180-1, 180-*j*. The calculated analytics may include concurrent users (CCU), session time, daily active users (DAU), monthly active users (MAU), and sessions. The encapsulated 3D streaming engine 150 may configure the 3D streaming session 130 as a video streaming cluster causing at least one of the plurality of servers 105-1, 105*n* to perform multicasting transmissions of packets including at least portions of the digital representation of the interactive 3D environment 165 to the one or more client devices 135-1, 135-*i*.

Dynamically adjusting the 3D streaming session 145 of the interactive 3D environment in response to input 175 received from the first client device 135-1 may further include the encapsulated 3D streaming engine 150 being configured to capture events associated with the interactive 3D environment. The events may be detected by one or more listeners at one or more of the client devices 135-1, 135-*i*. The dynamic adjusting may further include the encapsulated 3D streaming engine 150 being configured to capture metadata, consumption information and interaction data during the 3D streaming session 145 at the one or more of the client devices 135-1, 135-*i*. The dynamic adjusting may further include the encapsulated 3D streaming engine 175 being configured to respond to the captured events, metadata, consumption information and interaction data by redrawing the interactive 3D environment at the one or more client devices 135-1, 135-2, 135-*i* to sustain the digital representation of the interactive 3D environment 165.

The encapsulated 3D streaming engine 150 may sustain the digital representation of the interactive 3D environment 165 by calculating composite 3D video data based on the captured events, metadata, consumption information and interaction data defining a composite image layout based on properties derived from the 3D streaming session 145 at the one or more client devices 135-1, 135-*i*, configuring the 3D streaming session to provide a composite video signal according to the defined composite image layout, and transmitting the composite video signal in packets via a packetizer to the one or more client devices 135-1, 135-*i*. The encapsulated 3D streaming engine 150 may interface with the one or more client devices 135-1, 135-*i* to facilitate controlling a communication interface enabling voice, text, and video transmissions among the one or more client devices 135-1, 135-*i* in a packet switched communication system of the peer-to-peer network 110.

The encapsulated 3D streaming engine 150 may be configured as a container including bindings of software components. The software components may include at least one of: the library file 155 of the WebRTC API 115, event manager, scene manager, resource manager, session manager, physics manager and artificial intelligence system. The WebRTC API 115 may include one or more WebRTC API functions that are configured to call one or more of the software components. The encapsulated 3D streaming engine 150 may be other than a software plugin.

The encapsulated 3D streaming engine 150 can help improve the scalability of HTTP streaming delivery, as well as the scalability of the artificial intelligence system. The artificial intelligence system may include dynamic adaptive streaming over HTTP (MPEG-DASH) and deep learning video streaming architectures, such as deep neural networks, deep belief networks, deep reinforcement learning, recurrent neural networks and convolutional neural networks. The encapsulated 3D streaming engine 150 in communication with the artificial intelligence system can help configure the client devices 135-1, 135-I into self-learning HTTP Adaptive Streaming clients, such as State—action—reward—state—action (SARSA) or Q-learning (model-free reinforcement learning algorithm).

The input 175 may be received over a data channel established using a RTCDataChannel API. The encapsulated 3D streaming engine 150 may be configured to train an interactive frame prediction model for the digital representation of the interactive 3D environment 165 based on encoded streaming data of the 3D streaming session 145 and the events, the metadata, the interaction data and the consumption data from the one or more client devices 135-1, 135-*i*.

Example embodiments can enable streaming through the encapsulated 3D streaming engine 150 as a service for high-end 3D applications with ultra-low latency streaming technology. Any cloud provider may provide servers 105-1, 105*n* for the systems and methods described herein, such as, for example, Amazon Web Services (AWS), Google Cloud Platform (GCP), Azure, and OnPremise. Additionally, the encapsulated 3D streaming engine 150 may be embedded with one or more game engines such as Unreal engine, Unity, and others. Encoders may include, for example, NVIDIA nvenc, for encoding the 3D streaming session 145. Such encoders may encode the 3D streaming session 145 using, for example, codecs such as the h264 codec. The API 115 may be configured as a WebRTC API, or another API, for ultra-low latency video connections between client devices 135-1, 135-2, 135-*i* and GPU instances 170 provided by cloud-based servers 105-1, 105*n*.

Figure 3:
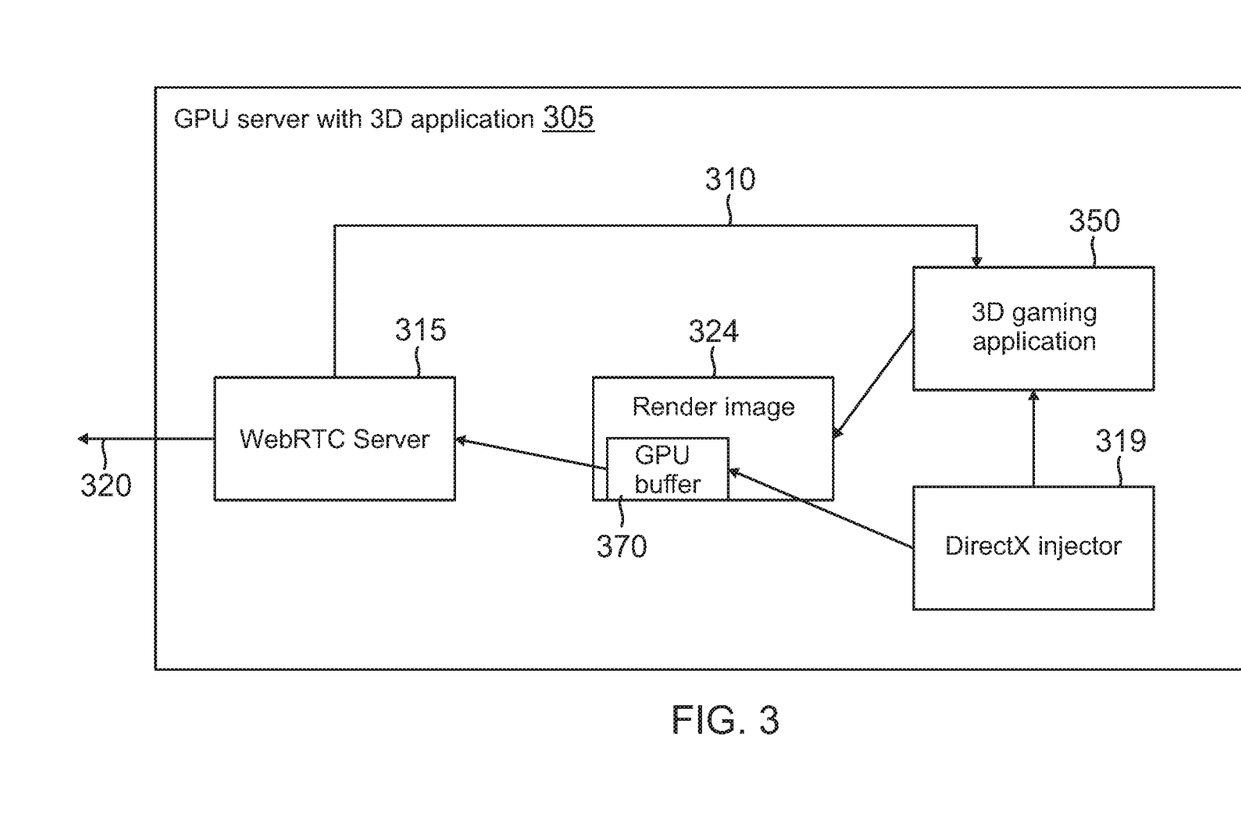
FIG. 3 is a schematic block diagram of an example embodiment of a video processing system.

FIG. 3 is a schematic block diagram of an example embodiment of a video processing system; particularly, a server 305 thereof providing a GPU 370 to support a 3D streaming session 145. In the example, the encapsulated 3D streaming engine 150 is provided by a 3D gaming application 350, which may be based on DirectX. The library file 155 of the WebRTC API 115 may be injected by a DirectX injector 319. Video data, including images, may be rendered 319 in a buffer of the GPU 370 upon receipt from the 3D gaming application 350. The rendered video data may be passed to a streaming server 315, which may be based on WebRTC, and may be configured to encode the video data according to an NVIDIA nvenc codec. The WebRTC server 315 may be configured to control 310 an interface to interact with the 3D gaming application 350. The encoded video data may be streamed 320 over the Internet by the WebRTC server 315.

The encapsulated 3D streaming engine 150 may include multiple executing instances, which can be distributed to a plurality of servers 16, 105-1, 105*n*. The encapsulated 3D streaming engine 150 may be configured to enable encoding of the 3D streaming session 145 by selectively using a predicted frame generated based on the trained interactive frame prediction model, and transmit the trained interactive frame prediction model and the encoded streaming data to the first client device and a second client device to create the digital representation of the interactive 3D environment 165. The first and second client devices 135-1, 135-2 may be configured to receive the trained interactive frame prediction model and the encoded streaming data and decode the encoded streaming data based on the trained interactive frame prediction model to create the digital representation of the interactive 3D environment 165.

In an example embodiment, the encapsulated 3D streaming engine 150 may be configured to train an interactive frame prediction model. The interactive frame prediction model may be configured and trained based on data from the streaming session, 3D models, user input, metadata and the consumption data related to the client session. The encapsulated 3D streaming engine 150 interfaces with the encoder and decoder to predict frames for the 3D stream using the trained interactive frame prediction model. For instance, the encoder may be configured to encode the 3D streaming data and transmit the trained interactive frame prediction model. The decoder can receive the 3D streaming data and transmit the trained interactive frame prediction model and decode the encoded streaming data based on the trained interactive frame prediction model, and provides reconstructed 3D streaming data at the client (s) 135-*i*, 135-1, 135-2.

In an example embodiment, the encapsulated 3D streaming engine 150 can be configured with deep neural network (DNN) based interactive frame prediction for video coding. For example, the interactive frame prediction can be trained and configured using the DNN to help improve video encoding and decoding efficiency. The DNN can be implemented at both encoder and decoder. The DNN can use previously decoded frames and the trained interactive frame prediction model to predict a current frame. This can be configured as separate interactive frame prediction mode prediction mode, which can enable optimization to compete with other prediction modes. It can be implemented to avoid transmission of motion vectors. In this way, the DNN can train the interactive frame prediction model to implement uni- and bi-directional prediction, which can provide significant coding efficiency gains relative to High Efficiency Video Coding, (H.265 and MPEG-H Part 2). DNN-based frame prediction.

In an embodiment, the encapsulated 3D streaming engine 150 can be configured to generate and process scene graphs for the transmission of 3D packet streams. The scene graphs can be generated with machine learning and machine vision computational prediction systems to provide powerful Scene Graph Generation (SGG). For example, the encapsulated 3D streaming engine 150 can perform Scene Graph Generation (SGG) that can be augmented with powerful semantic representation defining the scene. Scene Graph Generation (SGG) includes automatically mapping an image or a video into a semantic structural scene graph. This process may include encoding positional data regarding detected objects and their respective relationships, and this process can be scaled using deep learning techniques to improve system performance.

The Scene Graph Generation (SGG) models can be processed by the encapsulated 3D streaming engine 150 to render 3D video from visually-grounded scene graph. A scene graph may be a structural representation, which can capture detailed semantics by explicitly modeling objects. The semantic structure of the scene graph can be processed using perceptual statistics to compute maps that indicate which regions of a video frame are important to the human eye. This process can incorporate motion estimation for interframe prediction and motion vectors, resulting in encoded bitstreams. Motion vector quality metrics may be used to construct vector maps that can be used to encode the bitstreams using metrics such as block variance and block luminance. Application of vector maps and Scene Graph Generation (SGG) models in the 3D video encoding in a model-based compression framework such as continuous block tracking (CBT) can improve compression quality and bitstream throughput capacity for the encapsulated 3D streaming engine 150.

The Scene Graph Generation (SGG) may include parsing an image or a sequence of images in order to generate structured representations of visual scenes. The scene graph can be encoded with objects and their respective relationships, and contextual data surrounding and binding those visual relationships. In this way, machine learning predictions of objects and relationships predicted and modeled based on their surrounding context.

In an embodiment, the encapsulated 3D streaming engine 150 executing on the 305 GPU server with 3$d$ gaming application can be configured to recognize objects and scenes in static images with the use of a mathematical model or statistical learning, and then progress to do motion recognition, target tracking, action recognition etc. in the streaming video. An object or feature detector can obtain the shapes and their positions and attributes of the objects can be modeled in the three dimensional space, so as to help further realize detection, recognition, tracking, interaction and prediction of objects.

In an example, the 3D streaming engine 150 may be configured for real-time 3D rendering capabilities enabling streaming of 3D "hologram" content. In embodiment, 3D "hologram" content, including point clouds, multiviews, and streaming scene graphs (object-oriented representations of the 3D video content), and dynamic animated mesh with texture streaming.

Figure 4:
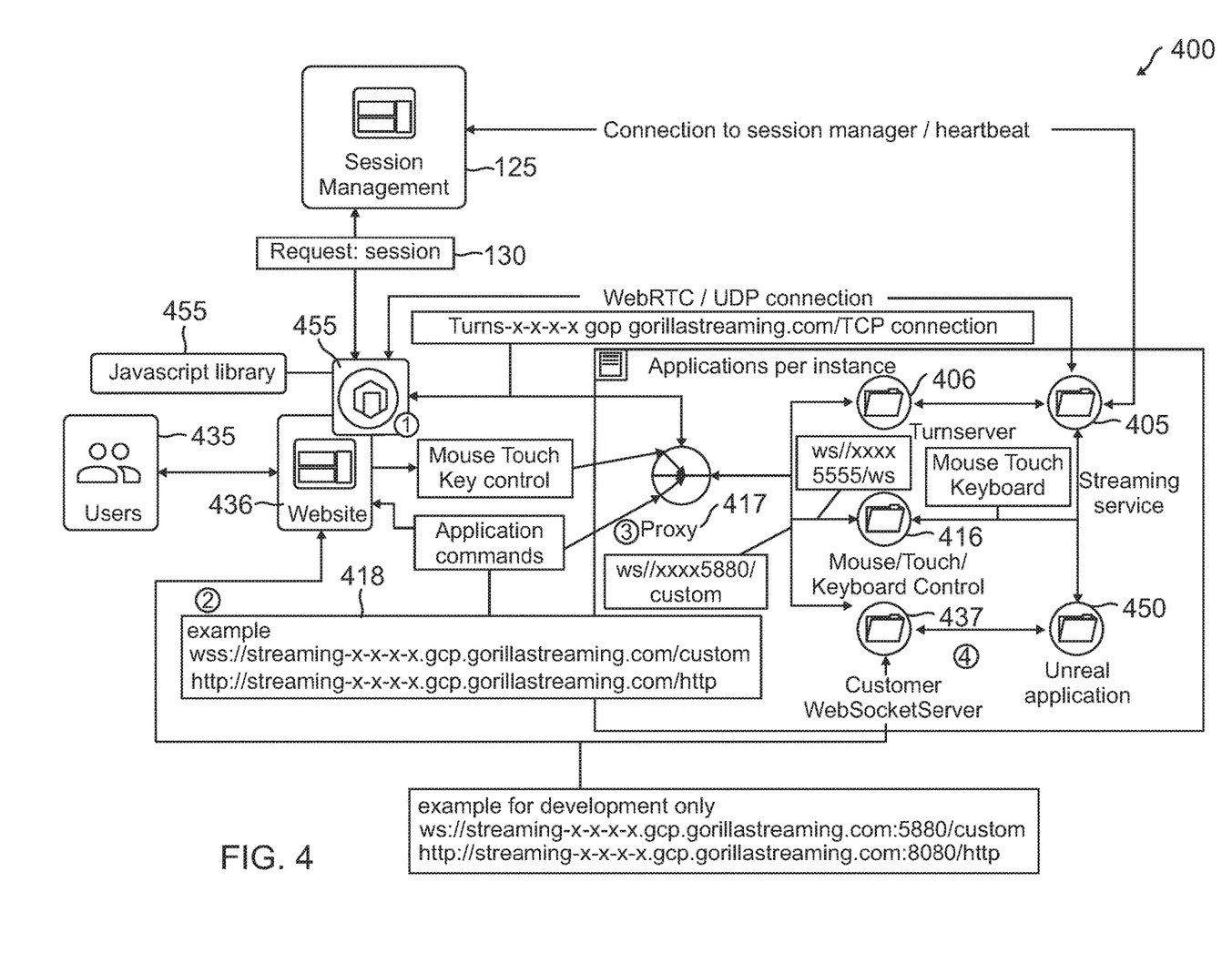
FIG. 4 is a schematic block diagram of an example embodiment of a video processing system.

FIG. 4 is a schematic block diagram of an example embodiment of a video processing system 400. In the example, a user 435, e.g., via the first client device 135-1, requests 130 a 3D streaming session 145 using a library file 145 such as a Javascript library 455. Session management, i.e., session handler 125, may manage a connection to a streaming service 405 supported by a server such as first server 105-1. The Javascript library 455, or another library, may be employed in handling input controls such as mouse, touch, and key controls. The Javascript library 455 may define specifications specific to a current session. A public-DomainName parameter 418 may be used to connect to a WebSocket server 437 to communicate with the streaming service 405 and associated encapsulated 3D streaming engine 150 such as Unreal application 450. Such connection may be secured by encryption such as Secure Sockets Layer (SSL), Transport Layer Security (TLS), or similar. A WebRTC API 115 may be configured as a proxy 417 to route incoming messages to WebSocket server 437 and provide aforementioned encryption. A turnserver 406 may interface between the proxy 417 and the streaming service 405. Additional mouse, touch, and keyboard controls may be handled between the proxy 417 and the streaming service 405. The WebSocket server 437 may receive incoming messages from a user 435 at a front-end interface such as a website 436. Such messages may include an identifier of a listening port of WebSocket server 437. Incoming and outgoing messages respectively arriving at and issuing from WebSocket server 437 may use separate communication paths. Such communication paths may be selected and configured manually. Multiple sessions of system 400 may be configured separately. A GPU instance 370 may thus host services separately, with no middleware or additional proxy required to be configured between services.

Example Streaming Use Cases

Figure 5A:
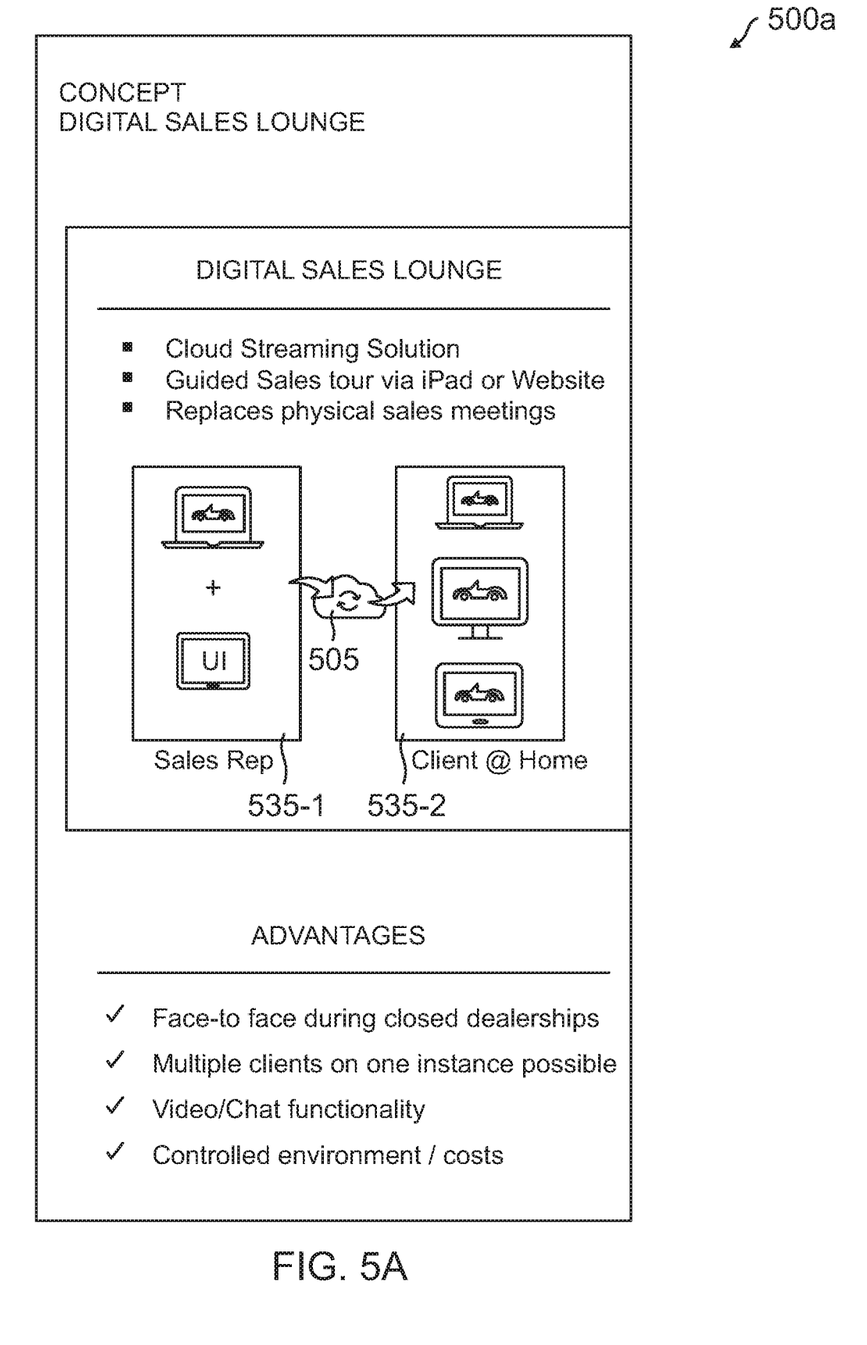
FIG. 5A is a schematic and summary of an example use case of embodiments of a video processing system.

FIG. 5A is a schematic and summary of an example use case 500$a$ of embodiments of a video processing system such as system 100. A sales representative 535-1 may, through a cloud-based server implementation 505 of system 100, connect with a remotely located client 535-2 and conduct a virtual guided sales tour. Advantages of such a connection include enablement of simulated face-to-face interaction, even if a point of sale is closed or otherwise inaccessible by clients 535-2, or even by sales representatives 535-1. Such an implementation 505 may host multiple clients on one instance of the implementation 505. Video and chat functionality may be provided by the implementation 505. Additionally, the implementation 505 provides a controlled environment for distribution of content related to products being offered by the sales representative 535-1, resulting in controlled costs of providing and maintaining said environment.

Website-based streaming according to the present disclosure may provide high-end 3D streaming experiences on public websites for multiple users. Streaming solutions for points-of-sale such as dealerships may thus be provided. Access to such streaming solutions may be limited to specific users, increasing security of the platform. Instead of buying and maintaining hardware such as proprietary streaming servers, points-of-sale may use the cloud streaming solution described herein, thus saving resources, which may generate increased returns when applied elsewhere, such as by improving customer experiences. Use cases can be provided on a global scale, so as to promote a high-quality connection between users and GPU cloud instances.

In an example embodiment, a digital sales lounge is provided for automobile dealerships. A dealership may act as a moderator by starting a streaming session and inviting multiple clients (e.g., up to 6 clients, or more) to an individual streaming session. All participants in the streaming session may view a common video presentation while being virtually unrestricted as to their physical location.

Figure 5B:
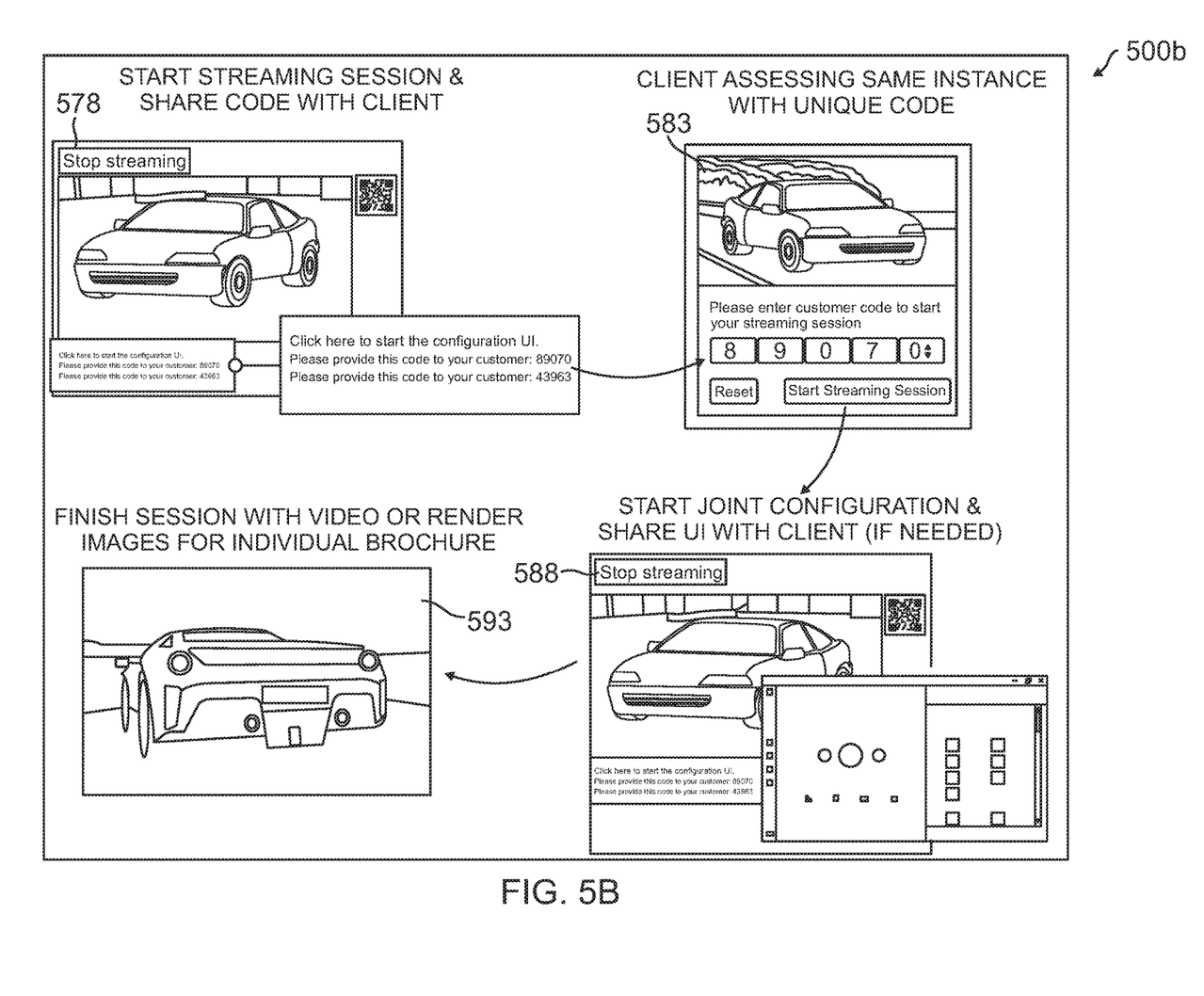
FIG. 5B depicts various example user interfaces of the example video processing system use case of FIG. 5A.

FIG. 5B is an illustration 500b of various example frames of a video presentation configured according to use case 500a of FIG. 5A. The illustration 500b shows a streaming session being initiated 578 with an access code being shared with a client 535-2, the client 535-2 accessing 583 the streaming session with the access code, a joint configuration application 588 being launched such that a sales representative 535-1 and the client 535-2 may work together to configure various options in an automobile to be offered for sale, and the streaming session concluding 593 with a custom video or images rendered for an individual brochure, according to options selected via the joint configuration application 588.

Challenges Encountered with Existing Real-Time Streaming Applications

Other real-time streaming applications in existence at the time of the present disclosure require profound technical expertise to develop a streaming solution or experience. Traditionally, it has been a very manual process to establish such a streaming environment. With prior approaches, it is generally difficult to create a reliable, scalable solution on a global level. Additionally, prior approaches generally fail to provide sufficiently high visual quality with sufficiently low latency. For prior approaches using Pixelstreaming, users are locked in to using Unreal engine as an encapsulated 3D streaming engine. Pixelstreaming additionally provides users with a limited feature set. Prior approaches require multiple service providers to establish a streaming service. As such, streaming via prior approaches is expensive, and it can be a complicated process to calculate the actual costs. Existing cloud-based streaming solutions suffer from a complex IT landscape within companies employing such solutions, making setup of such solutions difficult. The aforementioned challenges contribute to an undesirably long time to market for a streamed real-time solution.

Aspects of Real-Time Streaming Solution Disclosed Herein

Embodiments disclosed herein offer fully developed streaming technology available from an online marketplace such at Google Marketplace. Such streaming solutions may be set up via an easy and highly automated process, without development expertise needed from users. Such streaming solutions may thus be established to cater to content creators, rather than software developers. Streaming may be effectively separated from an associated application engine, resulting in no technical lock-in, e.g., in terms of specific application engines to be used. Complete streaming solutions may thus be provided, as from a one-stop shop.

Additionally, streaming solutions according to the present disclosure support a substantial variety of advanced technologies and provide a high-quality, high-performance streaming experience. Implementations may be unrestrictedly available worldwide. Setups may be flexible so as to satisfy a diversity of user requirements. Implementations use, as a blueprint, configurations such as Software as a Service (SaaS), and are thus compatible with most IT guidelines in corporations. Such streaming solutions also come with an affordable and easy to understand pricing structure.

Digital Processing Environment

Figure 6:
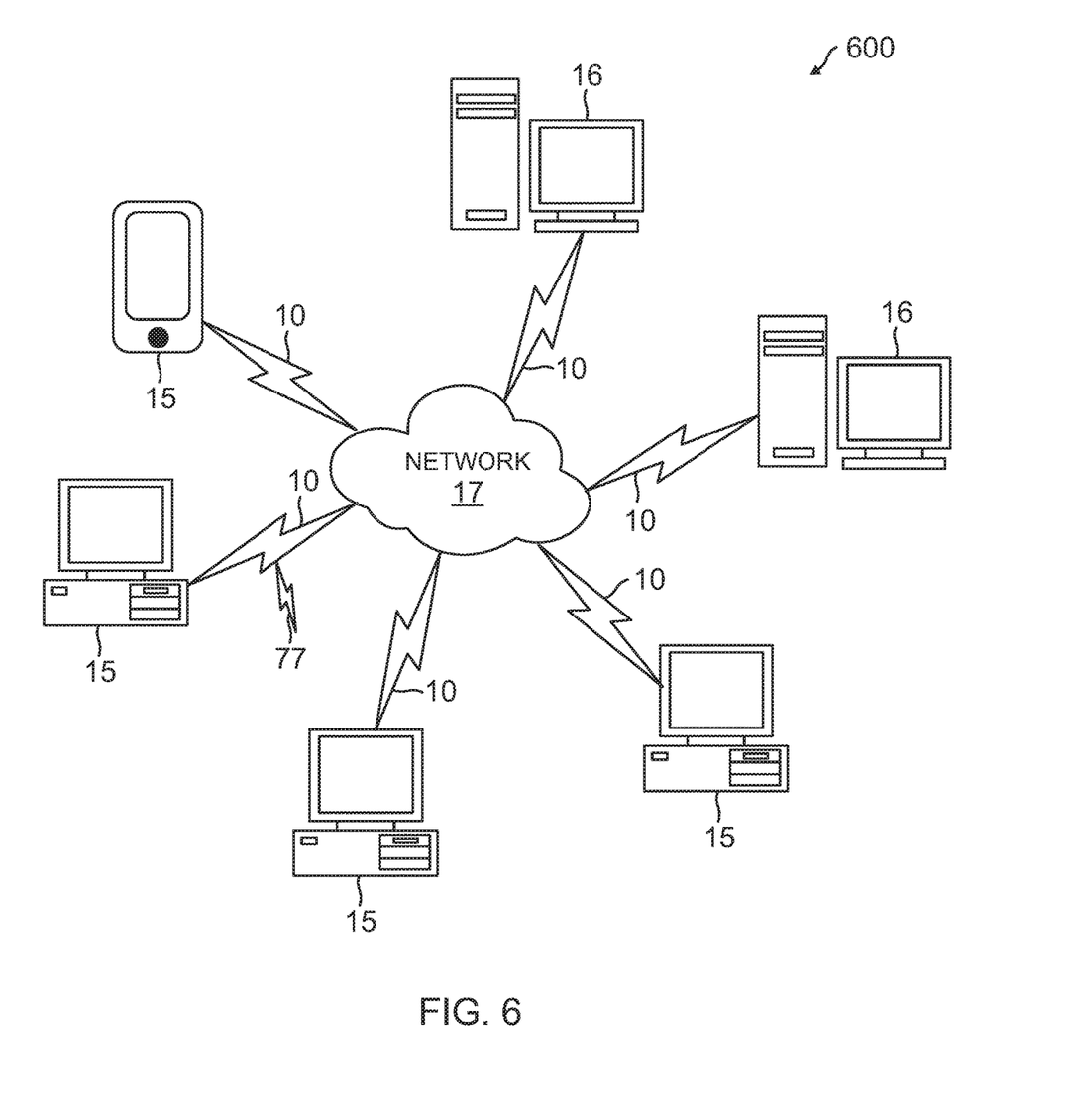
FIG. 6 is a schematic diagram of an example computer network environment in which embodiments of the present invention are deployed.

Example implementations of a multimedia system 600 for streaming selected media content to a client device 15 (e.g., client devices 135-1, 135-2, 135-i) of a user may be implemented in a software, firmware, or hardware environment. FIG. 6 illustrates one such environment. One or more client devices 15 (e.g. a mobile phone) and a cloud 16 (or server computer or cluster thereof) provide processing, storage, and input/output devices executing application programs and the like. Client devices may herein be referred to interchangeably as client computers.

Client devices 15 are linked through communications network 17 to other computing devices, including other client devices/processes 15 and server computer(s) 16. Communications network 17 can be part of a remote access network, a global network (e.g., the Internet), an out-of-band network, a worldwide collection of computers, Local area or Wide area networks, cloud networks, and gateways that currently use respective protocols (TCP/IP, HTTP, Bluetooth, etc.) to communicate with one another. Other electronic device/computer network architectures are suitable.

Server computers 16 (e.g., servers 105-1, 105n) may be configured to implement a streaming media server for provisioning, formatting, and storing selected media content (such as audio, video, text, and images/pictures), which is processed and played at client devices 15. The server computers 16 are communicatively coupled to client devices 15 that implement respective video encoders for capturing, encoding, loading, or otherwise providing the selected media content that is transmitted to the server computers 16. In one example embodiment, one or more of the server computers 16 are Java application servers that are scalable such that if there are spikes in traffic, the servers can handle the load increase.

Figure 7:
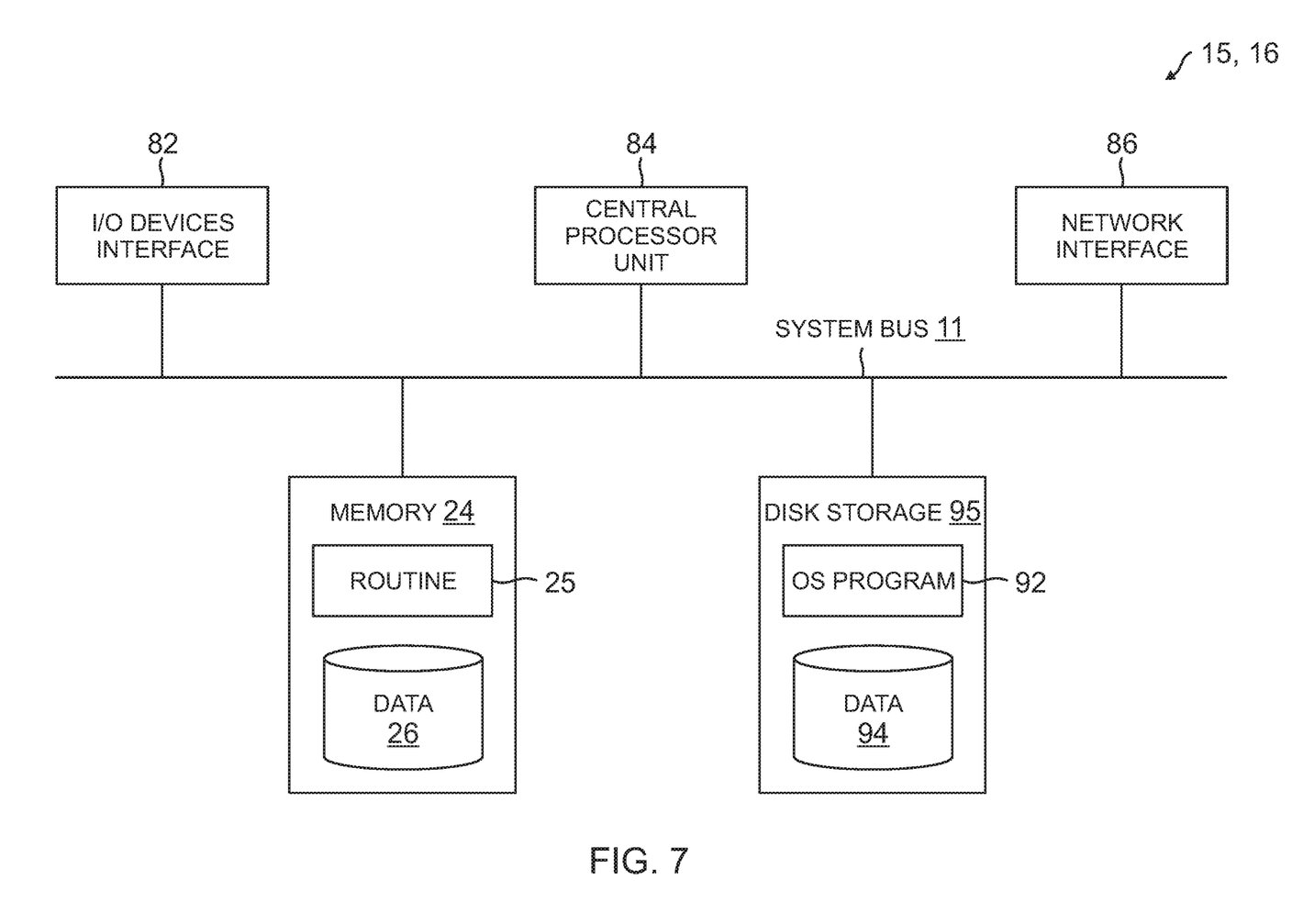
FIG. 7 is a block diagram of the computer nodes in the network of FIG. 6.

FIG. 7 is a diagram of the internal structure of a computer/computing node (e.g., client processor/device/mobile phone device/tablet 15, 135-i, 135-1, 135-2 or server computers server 16, 105-1, 105n) in the processing environment of FIG. 6, which may be used to facilitate displaying such audio, video, image, or data signal information. Each computer 15, 135-i, 135-1, 135-2, 16, 105-1, 105n contains a system bus 11, where a bus is a set of actual or virtual hardware lines used for data transfer among the components of a computer or processing system. Bus 11 is essentially a shared conduit that connects different elements of a computer system (e.g., processor, disk storage, memory, input/output ports, etc.) that enables the transfer of data between the elements. Attached to system bus 11 is I/O device interface 82 for connecting various input and output devices (e.g., keyboard, mouse, touch screen interface, displays, printers, speakers, etc.) to the computer 15, 16. Network interface 86 allows the computer to connect to various other devices attached to a network (for example the network illustrated at 17 of FIG. 6). Memory 24 provides volatile storage for computer software instructions 25 and data 26 used to implement a software implementation of the present invention (e.g. capturing/loading, provisioning, formatting, retrieving, downloading, and/or storing streams of selected media content and streams of user-initiated commands).

Disk storage 95 provides non-volatile storage for computer software instructions 92 (equivalently "OS program") and data 94 used to implement embodiments of the multimedia system 600 of the present invention. A central processor unit (CPU) 84 is also attached to system bus 11 and provides for the execution of computer instructions. The processor 84 may include one or more microprocessors, microcontrollers, digital signal processors, field programmable gate arrays (FPGAs), programmable logic devices, state machines, gated logic, discrete hardware circuits to handle the load balancing for 3D streaming.

In an embodiment, the CPU 84 is as a hybrid CPU/Graphics Processor Unit (GPU) with an embedded Vector Packet Processor (VPP) based hardware accelerator. The hybrid CPU/GPU with embedded VPP optimized to improve packet processing for a plurality of 3D streaming sessions, including full H.264 decoding of multiple channels. In an example embodiment, the hybrid CPU/Graphics Processor Unit (GPU) with an embedded Vector Packet Processor (VPP) based hardware accelerator is configured to handle hyperscale cloud workloads of the 3D streaming sessions including 5G transport processing, and 5G RAN intelligent controller (RIC) & edge inferencing. In one preferred example, the hybrid CPU/Graphics Processor Unit (GPU) with an embedded Vector Packet Processor (VPP) based hardware accelerator includes an integrated 1 terabit switch, and true inline streaming and highly programmable 3D packet processing. The VPP accelerator can deliver low latency and high throughput capacity, making it suitable for deploying a plurality of high-speed 3D streaming sessions.

In an embodiment, the hybrid CPU/Graphics Processor Unit (GPU) includes an embedded hardware/firmware implementation of the 3D streaming engine 150, which can spawn multiple executable instances of the encapsulated 3D streaming engine 150. Each encapsulated executing instance of the 3D streaming engine 150 is preferably in a container. In this way, a spawned instance of the 3D streaming engine 150 and respective libraries and dependencies execute in lightweight executable container that is capable of running consistently and can be optimized as a portable computer unit deployed faster and more securely. Unlike traditional computing methods, by executing the 3D streaming engine 150 in a container, when transferred to a new location, it is more resilient to bugs and errors. Containerization eliminates this problem by binding the application code together with the related configuration files, libraries, and dependencies required for it to run. This container can thereby potentially be abstracted away from the host system, and becomes portable—able to run across any platform or cloud, free of issues. In an embodiment, the encapsulated 3D streaming engine 150 may be implemented as virtual machine executing from a server 16, 105-1, 105n or via secure socket layer deployed at the client device 135-i, 135-1, 135-2.

In one embodiment, the processor routines 92 and data 94 of the multimedia processing system (video processing system) can be implemented a computer program product, including a computer readable medium capable of being stored on a storage device 95 or deployed as Software as a Service (Saas), which provides at least a portion of the software instructions for the multimedia processing system 600, encapsulated 3D streaming engine 150, 305 GPU server with 3d gaming application context verification 140, session handler 125. Instances of software embodiments of the multimedia processing system 600 may be implemented as a computer program product 92, and can be installed by any suitable software installation procedure, as is well known in the art. In another embodiment, at least a portion of the multimedia processing system 600 instructions may also be downloaded over a cable, communication and/or wireless connection. In other embodiments, the multimedia processing system 600 software components may be implemented as a computer program propagated signal product 77 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the multimedia processing system 600 routines/program 92.

In alternate embodiments, the propagated signal is an analog carrier wave or digital signal carried on the propagated medium. For example, the propagated signal may be a digitized signal propagated over a global network (e.g., the Internet), a telecommunications network, an out-of-band network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 15 may receive and read, such as by receiving the propagation medium and identifying a propagated signal embodied in the propagation medium, as described above for computer program propagated signal product.

The multimedia processing system 600 described herein may be configured using any known programming language, including any high-level, object-oriented programming language. A client computer/device 15 of the multimedia system 600 may be implemented via a software embodiment and may operate within a browser session. The multimedia processing system 600 may be developed using HTML, JavaScript, Flash, and such. The HTML code may be configured to embed the system into a web browsing session at a client 15. The Java Script can be configured to perform clickstream and session tracking at the client 15 and store the streaming media recordings and editing data in a cache. In another embodiment, the system may be implemented in HTML5 for client devices 15 that do not have Flash installed and use HTTP Live Streaming (HLS) or MPEG-DASH protocol. The system may be implemented to transmit media streams using a real-time streaming protocol, such as: Real-Time Messaging Protocol (RTMP), Real-Time Streaming Protocol (RTSP), Web Real-Time Communications (WebRTC), and the like. Components of the multimedia processing system 600 may be configured to create and load an XML, JSON, or CSV data file or other structured metadata file (such as a manifest file) with information about where and how components of the multimedia processing system 600 are stored, hosted, or formatted, such as timing information, size, footnote, attachments, interactive components, style sheets, etc.

In an example mobile implementation, the user interface framework for the components of the multimedia processing system 600 may be based on XHP, Javelin and WURFL. In another example mobile implementation for OS X and iOS operating systems and their respective APIs, Cocoa and Cocoa Touch may be implemented using Objective-C or any other high-level programming language that adds Smalltalk-style messaging to the C programming language.

Example Advantages

Benefits provided to users by streaming solutions as disclosed herein include the following. Embodiments come with low streaming cost for users (e.g., 70% less expensive than some current offerings). Also, no additional development cost is incurred on the client side. Implementations provide a very fast and automated process, enabling quick turnaround times for projects created by such implementations. Additionally, such streaming solutions do not suffer from limitations due to IT regulations, due to the SaaS approach used. Embodiments provide high performance streaming, with high visual quality and low latency. Such solutions avoid technical lock-ins and are thus open to future developments in the area of real time engines and streaming. Cost control may be provided through auto scaling of virtual compute instances based on actual demand. For example, a threshold may be employed to ensure that a minimum number of virtual compute instances are always available. Embodiments provide full transparency via individual dashboards for every client. Such dashboards may display information including a number of runtime instances configured or available. A full solution may be available from one provider as one service.

Such high-fidelity streaming solutions may be configured to support raytracing. 3D applications may be streamed according to the disclosed methods and systems without additional software plugins. External interfaces may be used to control the streaming application. Implementations may be agnostic to cloud providers and devices, working with many such providers and user device types. Embodiments may include built-in maintenance and analytics tools.

Any game engine or streaming engine may be supported. Modern web browsers, such as Chrome, Safari, Firefox, and others may be used in various implementations. Multiple applications may be hosted by a single graphics card or GPU. External protocols may be supported, such as HTTP and WebSocket. Implementations allow for analytics reporting, such as session time, concurrent users (CCU), and other analytics. Implementations may include an automatic shutdown feature. Cross-region support may be enabled by such streaming solutions. Website integration may be achieved, such as via included Javascript libraries. Existing streaming applications may be migrated easily to platforms configured according to the presently disclosed approach. Security may be provided globally, with source files and streaming applications secured on cloud servers. Automatic scaling of virtual compute instances according to a number of connected users may enable, for example, over one thousand users to connect to a service. All general application features may be supported, including animations, products in motion, etc.

While example embodiments have been particularly shown and described, it will be understood by those skilled in the art that various changes in form and details may be made therein without departing from the scope of the embodiments encompassed by the appended claims.

What is claimed is:

1. A video processing system comprising:
   a plurality of servers operating in a peer-to-peer communication network via a WebRTC application programming interface (API) to generate 3D streaming data;
   the plurality of servers responding to a session handler receiving a request for a 3D streaming session at a first client device by:
   (i) receiving from the session handler in communication with the first client device, context verification about the first client device including an internet protocol (IP) location of the first client device;
   (ii) responding to the context verification about the first client device by assigning a first server from the plurality to direct a 3D streaming session at the first client device based on the internet protocol (IP) location of the first client device;
   (iii) directing a first instance of an encapsulated 3D streaming engine at the first server to initiate the 3D streaming session via the WebRTC application programming interface (API) at the first client device;
   (iv) injecting a library file of the WebRTC application programming interface (API) into an executable file of the encapsulated 3D streaming engine to generate a digital representation of an interactive 3D environment for the 3D streaming session at the first client device;
   (v) rendering the digital representation of the interactive 3D environment within a buffer of a graphics processing unit (GPU);
   (vi) an encoder encoding the rendered representation for transmission of the 3D streaming session to the first client device;
   (vii) streaming the encoded representation of the interactive 3D environment at the first client device;
   (viii) dynamically adjusting the 3D streaming session of the interactive 3D environment in response to input received from the first client device; and
   (ix) sustaining the digital representation of the interactive 3D environment of the 3D streaming session by iteratively processing (v) through (viii) until the 3D streaming session is terminated at the first client device.

2. The video processing system as in claim 1 wherein the first server is configured to establish a pre-determined number of virtual compute instances of the 3D streaming session to one or more client devices; and
   the first server is configured to automatically adjust the provided number of virtual compute instances based on a change in number of the client devices, where at least one of the one or more client devices is the first client device.

3. The video processing system as in claim 2 wherein at least one of the plurality of servers is configured to respond to requests for 3D streaming sessions from the client devices by assigning a server from the plurality of servers to respond to the respective requests for 3D streaming sessions, where the first server is one of the plurality of servers.

4. The video processing system as in claim 3 wherein at least one of the plurality of servers compute analytics to determine an appropriate number of 3D streaming sessions for the plurality of client devices scaled based on the pre-determined number of virtual compute instances.

5. The video processing system as in claim 4 wherein the calculated analytics includes concurrent users (CCU), session time, daily active users (DAU), monthly active users (MAU), and sessions.

6. The video processing system as in claim 3 wherein the encapsulated 3D streaming engine configures the 3D streaming session as a media streaming cluster causing at least one of the plurality of servers to perform multicasting transmissions of packets including at least portions of the digital representation of the interactive 3D environment to the one or more client devices.

7. The video processing system as in claim 6 wherein dynamically adjusting the 3D streaming session of the interactive 3D environment in response to input received from the first client device further includes:
   the encapsulated 3D streaming engine configured to capture events associated with the interactive 3D environment, the events being detected by one or more listeners at one or more of the client devices;

the encapsulated 3D streaming engine configured to capture metadata, consumption information and interaction data during the 3D streaming session at the one or more of the client devices;

the encapsulated 3D streaming engine configured to respond to the captured events, metadata, consumption information and interaction data by redrawing the interactive 3D environment at the one or more client devices to sustain the digital representation of the interactive 3D environment.

8. The video processing system as in claim 6 wherein the encapsulated 3D streaming engine sustains the digital representation of the interactive 3D environment by:

calculating composite 3D media data based on the captured events, metadata, consumption information and interaction data;

defining a composite image layout based on properties derived from the 3D streaming session at the one or more client devices configuring the 3D streaming session to provide a composite media signal according to the defined composite image layout; and transmitting the composite media signal in packets via a packetizer to the one or more client devices.

9. The video processing system as in claim 6 further including the encapsulated 3D streaming engine interfacing with the one or more client devices to facilitate controlling a communication interface enabling voice, text, and video transmissions among the one or more client devices in a packet switched communication system of the peer-to-peer network.

10. The video processing system as in claim 6 wherein the encapsulated 3D streaming engine is configured to train an interactive frame prediction model for the digital representation of the interactive 3D environment based on encoded streaming data of the 3D streaming session and the events, the metadata, the interaction data and the consumption data from the one or more client devices.

11. The video processing system as in claim 10 wherein the encoder is configured to encode the 3D streaming session by selectively using a predicted frame generated based on the trained interactive frame prediction model, and transmit the trained interactive frame prediction model and the encoded streaming data to the first client device and a second client device to create the digital representation of the interactive 3D environment; and the first and second client devices are configured to receive the trained interactive frame prediction model and the encoded streaming data and decode the encoded streaming data based on the trained interactive frame prediction model to create the digital representation of the interactive 3D environment.

12. The video processing system as in claim 1 wherein the encapsulated 3D streaming engine is configured as a software container including bindings of software components having configuration files, libraries, and dependencies required for execution; wherein the encapsulated 3D streaming engine is not a software plugin.

13. The video processing system as in claim 12 wherein the software components include at least one of: the library file of the WebRTC application programming interface (API), event manager, scene manager, resource manager, session manager, physics manager and artificial intelligence system; and wherein the WebRTC application programming interface (API) includes one or more WebRTC application programming interface (API) functions that are configured to call one or more of the software components.

14. The video processing system as in claim 12 wherein the encapsulated 3D streaming engine is deployed as a virtual machine via a Secure Sockets Layer (SSL), the virtual machine being configured in the software container; wherein the input is received over a data channel established using a RTCDataChannel application programming interface (API).

15. A video processing method comprising:

configuring a server computer system to respond to a session handler receiving a request for a 3D streaming session at a first client device by:

(i) receiving from the session handler in communication with the first client device, context verification about the first client device including an internet protocol (IP) location of the first client device;

(ii) responding to the context verification about the first client device by assigning a first server from a plurality of servers of the server computer system to direct a 3D streaming session at the first client device based on the internet protocol (IP) location of the first client device;

(iii) directing a first instance of an encapsulated 3D streaming engine at the first server to initiate the 3D streaming session via the WebRTC application programming interface (API) at the first client device;

(iv) injecting a library file of the WebRTC application programming interface (API) into an executable file of the encapsulated 3D streaming engine to generate a digital representation of an interactive 3D environment for the 3D streaming session at the first client device;

(v) rendering the digital representation of the interactive 3D environment within a buffer of a graphics processing unit (GPU);

(vi) encoding via an encoder the rendered representation for transmission of the 3D streaming session to the first client device;

(vii) streaming the encoded representation of the interactive 3D environment at the first client device;

(viii) dynamically adjusting the 3D streaming session of the interactive 3D environment in response to input received from the first client device; and (ix) sustaining the digital representation of the interactive 3D environment of the 3D streaming session by iteratively processing (v) through (viii) until the 3D streaming session is terminated at the first client device.

16. The video processing method as in claim 15 further comprising configuring the first server to establish a predetermined number of virtual compute instances of the 3D streaming session to one or more client devices; and configuring the first server to automatically adjust the provided number of virtual compute instances based on a change in number of the client devices, where at least one of the one or more client devices is the first client device.

17. The video processing method as in claim 16 further comprising configuring at least one of the plurality of servers to respond to requests for 3D streaming sessions from the client devices by assigning a server from the plurality of servers to respond to the respective requests for 3D streaming sessions, where the first server is one of the plurality of servers.

18. The video processing method as in claim 17 further comprising configuring at least one of the plurality of servers to compute analytics to determine an appropriate number of 3D streaming sessions for the plurality of client devices scaled based on the pre-determined number of virtual compute instances.

19. The video processing method as in claim 18 further comprising configuring the calculated analytics to include concurrent users (CCU), session time, daily active users (DAU), monthly active users (MAU), and sessions.

20. The video processing method as in claim 17 further comprising configuring the 3D streaming session as a media streaming cluster causing at least one of the plurality of servers to perform multicasting transmissions of packets including at least portions of the digital representation of the interactive 3D environment to the one or more client devices.

21. The video processing method as in claim 20 wherein dynamically adjusting the 3D streaming session of the interactive 3D environment in response to input received from the first client device further includes:
configuring the encapsulated 3D streaming engine to capture events associated with the interactive 3D environment, the events being detected by one or more listeners at one or more of the client devices;
configuring the encapsulated 3D streaming engine to capture metadata, consumption information and interaction data during the 3D streaming session at the one or more of the client devices;
configuring the encapsulated 3D streaming engine to respond to the captured events, metadata, consumption information and interaction data by redrawing the interactive 3D environment at the one or more client devices to sustain the digital representation of the interactive 3D environment.

22. The video processing method as in claim 20 wherein the encapsulated 3D streaming engine sustains the digital representation of the interactive 3D environment by:
calculating composite 3D media data based on the captured events, metadata, consumption information and interaction data;
defining a composite image layout based on properties derived from the 3D streaming session at the one or more client devices
configuring the 3D streaming session to provide a composite media signal according to the defined composite image layout; and
transmitting the composite media signal in packets via a packetizer to the one or more client devices.

23. The video processing method as in claim 20 further including causing the encapsulated 3D streaming engine to interface with the one or more client devices to facilitate controlling a communication interface enabling voice, text, and video transmissions among the one or more client devices in a packet switched communication system of the peer-to-peer network.

24. The video processing method as in claim 20 further comprising configuring the encapsulated 3D streaming engine to train an interactive frame prediction model for the digital representation of the interactive 3D environment based on encoded streaming data of the 3D streaming session and the events, the metadata, the interaction data and the consumption data from the one or more client devices;
wherein at least one of the plurality of servers includes a hybrid CPU/Graphics Processor Unit (GPU) with an embedded encapsulated 3D streaming engine having a Vector Packet Processor (VPP) based hardware accelerator optimized to improve packet processing for a plurality of the 3D streaming sessions, including full H.264 decoding of multiple channels.

25. The video processing method as in claim 15 further comprising configuring the encapsulated 3D streaming engine to as a container including bindings of software components having configuration files, libraries, and dependencies required for execution; wherein the encapsulated 3D streaming engine is not a software plugin.

26. The video processing method as in claim 25 wherein the software components include at least one of: the library file of the WebRTC application programming interface (API), event manager, scene manager, resource manager, session manager, physics manager and artificial intelligence system; and
wherein the WebRTC application programming interface (API) includes one or more WebRTC application programming interface (API) functions that are configured to call one or more of the software components.

27. The video processing method as in claim 15 further comprising deploying the encapsulated 3D streaming engine as a virtual machine via a Secure Sockets Layer (SSL), the virtual machine being configured in the software container; receiving the input over a data channel established using a RTCDataChannel application programming interface (API).

28. The video processing method as in claim 27 further comprising configuring the encoder to encode the 3D streaming session by selectively using a predicted frame generated based on the trained interactive frame prediction model, and transmit the trained interactive frame prediction model and the encoded streaming data to the first client device and a second client device to create the digital representation of the interactive 3D environment; and
configuring the first and second client devices to receive the trained interactive frame prediction model and the encoded streaming data and decode the encoded streaming data based on the trained interactive frame prediction model to create the digital representation of the interactive 3D environment.

* * * * *